United States Patent
Forge et al.

(10) Patent No.: US 12,502,114 B2
(45) Date of Patent: Dec. 23, 2025

(54) AMYLOID FIBERS BASED ELECTRODES

(71) Applicants: COMMISSARIAT À L'ÉNERGIE ATOMIQUE ET AUX ÉNERGIES ALTERNATIVES, Paris (FR); CENTRE NATIONAL DE LA RECHERCHE SCIENTIFIQUE, Paris (FR)

(72) Inventors: Vincent Forge, Grenoble (FR); Patrice Rannou, Grenoble (FR); Julien Hurtaud, Grenoble (FR); David Ratel, Grenoble (FR)

(73) Assignees: COMMISSARIAT À L'ÉNERGIE ATOMIQUE ET AUX ÉNERGIES ALTERNATIVES, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 586 days.

(21) Appl. No.: 17/905,366

(22) PCT Filed: Mar. 10, 2021

(86) PCT No.: PCT/EP2021/055991
§ 371 (c)(1),
(2) Date: Aug. 31, 2022

(87) PCT Pub. No.: WO2021/180761
PCT Pub. Date: Sep. 16, 2021

(65) Prior Publication Data
US 2023/0087381 A1    Mar. 23, 2023

(30) Foreign Application Priority Data
Mar. 10, 2020  (EP) ................... 20305249

(51) Int. Cl.
*A61B 5/263* (2021.01)
*A61B 5/00* (2006.01)
(Continued)

(52) U.S. Cl.
CPC ............ *A61B 5/263* (2021.01); *A61B 5/0031* (2013.01); *A61B 5/293* (2021.01); *A61N 1/05* (2013.01); *G01N 27/327* (2013.01); *G06F 3/015* (2013.01)

(58) Field of Classification Search
CPC ....... A61B 5/263; A61B 5/0031; A61B 5/293; A61N 1/05; G01N 27/327; G06F 3/015
See application file for complete search history.

(56) References Cited

U.S. PATENT DOCUMENTS

| | | | |
|---|---|---|---|
| 2015/0051663 A1* | 2/2015 | Hagedorn | A61N 1/0456 607/45 |
| 2018/0334483 A1* | 11/2018 | Joshi | C07K 14/395 |
| 2020/0124561 A1* | 4/2020 | Park | G01N 33/1813 |

FOREIGN PATENT DOCUMENTS

| | | | |
|---|---|---|---|
| CN | 209519237 U | * | 10/2019 |
| EP | 3196350 A1 | | 7/2017 |

OTHER PUBLICATIONS

International Search Report mailed May 25, 2021, issued in corresponding International Patent Application No. PCT/EP2021/055561, filed Mar. 10, 2021, 4 pages.

(Continued)

*Primary Examiner* — Eun Hwa Kim
*Assistant Examiner* — William Mossbrook
(74) *Attorney, Agent, or Firm* — CHRISTENSEN O'CONNOR JOHNSON KINDNESS PLLC (57) ABSTRACT

Amyloid fibers-based electrodes and apparatuses comprising the same. Additionally, methods for manufacturing amyloid fibers-based electrodes.

12 Claims, 8 Drawing Sheets

(51) Int. Cl.
   *A61B 5/293*   (2021.01)
   *A61N 1/05*    (2006.01)
   *G01N 27/327*  (2006.01)
   *G06F 3/01*    (2006.01)

(56) References Cited

OTHER PUBLICATIONS

International Written Opinion mailed May 25, 2021 issued in corresponding International Patent Application No. PCT/EP2021/055561, filed Mar. 10, 2021, 7 pages.
Kabay, G. et al, "Amyloid-like protein nanofibrous membranes as a sensing layer infrastructure for the design of mass-sensitive biosensors," Biosensors and Bioelectronics, vol. 97, Jun. 10, 2017, pp. 285-291.

* cited by examiner

AMYLOID FIBERS BASED ELECTRODES

CROSS-REFERENCES TO RELATED APPLICATIONS

This application is a National Stage of International Application No. PCT/EP2021/055991 filed Mar. 10, 2021, which claims priority to European Patent Convention application No. 20305249.3, filed Mar. 10, 2020, the entire disclosures of which are hereby incorporated by reference.

The invention pertains to amyloid fibers based electrodes and apparatuses comprising the same.

In most of brain-machine interfaces (BMIs) developed to date, electrodes are made of non-organic materials, therefore using electrons as signal mediators. However, in all living organisms, from bacteria to humans, potential fields are created by the diffusion of ions/protons through membranes. This difference in the type of charge carriers induces a hand full of complications and precautions when it comes to create an effective BMI.

At the genesis of this field, electrodes were made of simple metal conductive wires (silver, copper, . . . ) and, then, evolved into much more complex array structures made of several layers of materials, each of them having specific and essential functions: Pt/Ir/Si for recording sites, Si-Metal-Polyimide as the core and oxides for coatings.

So-called "Microwire Arrays" (MWAs) were developed and allowed the long-lasting recording of neuron activity over large area, i.e. for several months. Per se, their geometry can be customized on demand to accommodate diverse experimental constraints imposed by measurements: shape of the interface, deepness of the recording zone, suitable contact with the tissue. MWAs facilitate access to deep brain structure like hippocampus or amygdala. However, despite undeniable advantages, this type of devices suffers from severe drawbacks inherent to their nature. Indeed, the implantation of non-organic material in a living organism generates many problems, such as reproducibility in the shape of the electrodes (thickness of the insulating layer, size tip, diameters, . . . ), difficulty of multi-monitoring on a single wire due to tedious and costly fabrication processes, substantial damages to the brain at the implantation site (depending on the diameter and stiffness of the coating material), bending of the device during its implantation leading to a placement incertitude of the electrode. Moreover, most of the devices suffer from current leakage and/or signal/noise ratio degradation only a few weeks after their implantation. Indeed, glial scar formation is inherent to foreign-body response. The body rejects the electrodes and tries to digest it by the accumulation of astrocytes and enzymes around the scar.

To solve some of these acute issues, new generations of electrode arrays were developed.

Most of new generation devices used for human intra-cortical recordings adopt the so-called "Utah Electrode Arrays" (UEAs) design. Using lithography technology on silicon wafers, electrode's geometry was downscaled by few orders of magnitude, down to few hundreds of µm. This allows recording and stimulating neurons every 250-400 µm, down to 1.5 µm in the cortex, with high signal/noise ratio. Due to the obtained high density of electrode wires on the substrate, these devices are very well-suited for large animals (rodents, cats, chimps, humans, . . . ).

During the last few years, research groups worldwide have further refined this design, notably by generating multiple electrodes onto a single wire (MMWA). By integrating complementary metal oxide semiconductor (CMOS) circuits within the architecture of wires, 3D recording matrix has allowed the processing of up to 188 recording sites per implant. The technological leap with MMWAs is substantial, but these devices are still far from being perfect. Performance, stability and reproducibility have largely increased but MMWAs generate some specific technical problems, such as production costs or energy consumption, and also suffer from limitations due to the lack of biocompatibility. Indeed, even if downsized to the sub-100 µm size, these devices still cause large tissue displacement coupled with glial scar foreign-body reaction and only half of the electrodes remain active four weeks after implantation.

Since making devices of ever-increasing complexity inflates fabrication processes and increases costs for a final result that remains ultimately limited by the compatibility of non-organic material with the biological tissues, it has thus become very challenging to solve the issue of biocompatibility of electrodes.

A solution to improve biocompatibility between the nervous system and implants is the use of polymeric materials such as Polyimide, Polydimethylsiloxane (PDMS) or SU-8 as substrate/coating for non-organic electrodes. Organic polymers are advantageous for multiple reasons: their stiffness can be tuned to match the ones of brain tissues, they enable soft interfacing and induce less damages to the surrounding matrix, they allow the production of flexible electrode, they can be functionalized with organic agents and they show good compatibility with metal deposition techniques. Because of their biocompatibility and intrinsic proton charge transport, functional polymer coatings and conductive polymer electrodes appear as promising candidates for cheaper and more efficient devices.

However, as regards with an application to BMIs, each polymer material shows its own strengths and limitations in light of the spatial and temporal scales of brain processes. Indeed, brain processes occur over weeks to years in multiple coordinated brain regions, but involve electrophysiological changes that must be quantified on the millisecond and micrometer scales of individual neurons. Some conventional devices cannot keep up with the high resolutions and large spans of these desired spatiotemporal scales.

There thus remains a genuine need for electrodes ensuring biocompatibility and being adapted for the conduction of neuron signals.

The present invention is believed to meet such need by providing amyloid fibers-based electrodes.

Amyloid fibers are highly ordered cross-β sheet protein aggregates that can be found in nature in various organisms and performing different types of functions essential for the living. In the human body, amyloids are often associated with organ dysfunctions (for example in Alzheimer's disease), but also with native functions such as protein/peptide hormone storage.

Surprisingly, the Inventors have demonstrated the biocompatibility of amyloid fibers and their capacity to conduct neuron-like signals. Making electrodes based on amyloid fibers present multiple benefits that can enhance the quality of next generation neural interfaces:

1. Fully biocompatible. No cytotoxic potential was discovered during in vitro tests. Moreover, glial scar should not be an issue post-implantation due to the nature of the material.
2. Very high protonic and ionic conductivity, similar to that of biological neuronal tissues, which creates depolarization by segregation of ions through membranes. That similarity enables direct contact between neurons and electrodes. Moreover, the protonic and ionic conductivity does not require any particular modification of the amino acid sequence of the proteins. Contrary to the electrodes of the prior art, the electrodes of the invention are not based on electronic conduction and they thus do not require the design of electron conductive fibers comprising redox or aromatic centers which can cause issues with neurons.

3. Stiffness close to that of brain tissues. A thin film is able to follow perfectly organs movement without damaging the organs or itself.
4. Bioresorbable in the brain. After 4 months in rat's brain, the implanted film started to be assimilated and absorbed by the brain without any damage in rat's functions.
5. Functionalizable. Because amyloid fibers are proteins, their molecular structure can be modified, chemically or genetically, in order to gain in functionality or to enhance a property of interest.
6. Tunable conductivity in response to changes in relative humidity.
7. Fast charge transport within fibers (raising time ~10 μs).
8. High stability. No loss of signal after hours of continuous high frequency stimulations.
9. Easy to process and cheap biomaterial. In particular, the fibers of the invention are formed spontaneously by self-assembly and they do not require electrospinning contrary to the electrodes of the prior art.

In an aspect, the present invention thus relates to an electrode comprising at least one electrically conducting layer of amyloid fibers.

By "electrode" is meant, according to the present invention, an electric conductor through which a current enters or leaves a non-metal based medium. In the invention, electrodes are mainly used to contact an electronic medical apparatus with the body of the subject. The electrodes of the invention are able to convert ionic potentials of a biological tissue into electronic potentials processed by the medical apparatus and/or to convert electronic potentials generated by a medical apparatus into ionic potentials transferred to a biological tissue.

In the present invention, the expression "amyloid fibers" refers to proteinaceous self-assemblies resistant to degradation, further characterized by a β-sheet secondary structure and an ability to be stained by particular dyes, such as Congo red. Proteins and peptides able to generate amyloid fibers can be either produced as recombinant proteins or peptides or extracted at monomeric state very easily in the most common products available. For example, α-lactalbumin can be found at a concentration of 1.2 g/L in cow milk and the prion-domain of HET-s is found in filamentous fungi (including e.g. *Podospora anserina*) and can be produced as a recombinant protein in *E. coli* bacteria.

In an embodiment, the invention relates to the electrode as defined above wherein the layer of amyloid fibers covers a surface or an extremity of the electrode that is positioned in contact with a biological tissue.

In an embodiment, the invention relates to the electrode as defined above wherein the layer of amyloid fibers covers a surface or an extremity of the electrode that is intended to be positioned in contact with a biological tissue.

As shown in the examples, amyloid fibers are biocompatible and able to efficiently conduct neuron-like signals. Consequently, this material is particularly appropriate to be used as interface surface at the contact zone of the electrode with the biological tissue.

In an embodiment, the invention relates to the electrode as defined above, wherein said electrode provides a bidirectional communication between a biological tissue and a medical apparatus.

In an embodiment, the invention relates to the electrode as defined above, wherein said electrode is configured for enabling a bidirectional communication between a biological tissue and a medical apparatus.

In the present invention, the expression "bidirectional communication" means that the electrode can be used to transfer a current from a biological tissue to an apparatus and from an apparatus to a biological tissue.

Indeed, in electrophysiological medical devices, electrodes are used not only to detect or to record electric signals within the body of a subject (e.g. encephalogram, electrocardiogram, . . . ), but also to stimulate the body by administering an electric signal, in particular by simulating nervous signals (e.g. deep brain stimulation, pacemaker, . . . ).

In an embodiment, the present invention relates to an electrode as defined above, wherein the layer presents an isotropic or anisotropic structural organization depending on variations applied to its processing.

In an embodiment, the invention relates to the electrode as defined above, wherein said layer of amyloid fibers is in the form of a film.

In an embodiment, the invention relates to the electrode as defined above, wherein said layer of amyloid fibers is in the form of a gel, preferably a hydrogel.

In an embodiment, the invention relates to the electrode as defined above, wherein said layer of amyloid fibers has a thickness not exceeding 100 μm, preferably not exceeding 50 μm, and most preferably not exceeding 10 μm, when said layer of amyloid fibers is in a dry environment.

In an embodiment, the invention relates to the electrode as defined above, wherein said layer of amyloid fibers has a thickness not exceeding 100 μm, 50 μm, 10 μm, 5 μm or 1 μm, when said layer of amyloid fibers is in a dry environment.

In an embodiment, the invention relates to the electrode as defined above, wherein said layer of amyloid fibers has a thickness of about 1, 2, 3, 4, 5, 6, 7, 8, 9, 10, 15, 20, 25, 30, 35, 40, 45, 50, 55, 60, 65, 70, 75, 80, 85, 90, 95 or 100 μm, when said layer of amyloid fibers is in a dry environment.

In an embodiment, the invention relates to the electrode as defined above, wherein said layer of amyloid fibers has a thickness not exceeding 1000 μm, preferably not exceeding 100 μm, and most preferably not exceeding 10 μm, when said layer of amyloid fibers is in an aqueous environment.

In an embodiment, the invention relates to the electrode as defined above, wherein said layer of amyloid fibers has a thickness not exceeding 1000 μm, 900 μm, 800 μm, 700 μm, 600 μm, 500 μm, 400 μm, 300 μm, 200 μm or 100 μm, when said layer of amyloid fibers is in an aqueous environment.

In an embodiment, the invention relates to the electrode as defined above, wherein said layer of amyloid fibers has a thickness of about 1, 2, 3, 4, 5, 6, 7, 8, 9, 10, 15, 20, 25, 30, 35, 40, 45, 50, 55, 60, 65, 70, 75, 80, 85, 90, 95, 100, 150, 200, 250, 300, 350, 400, 450, 500, 550, 600, 650, 700, 750, 800, 850, 900, 950 or 1000 μm, when said layer of amyloid fibers is in an aqueous environment.

In an embodiment, the invention relates to the implantable electrode as defined above, wherein said amyloid fibers are aggregates of monomers of a protein or a peptide selected from the group comprising: HET-s prion domain, α-lactalbumin, Lysozyme, $A\beta_{1-42}$, htau, α-synuclein, TTR (V30M), IAPP, β-Lacloglobulin, HAS, Insulin, CSNNFGA, NNLAIVTA, CsgA, PMEL17, Ure2p, Orb2 (CPEB), SH3 domain PI3 kinase, Acylphosphatase, Prion Protein, Islet Amyloid PolyPeptide, Prolactin, Galectin 7, Corneodesmosin, Lactadherin, Kerato-epithelin, Lactoferrin, Semenogelin, Enfuvirtide, APP, Apolipoproteins, Gelsolin, β2-microglobulin, Transthyretin, TasA, FapC, SP-C, LECT-2, Proteins S100A8/A9, Huntingtin exon-1, Fragment of Immunoglobulin Heavy Chain, Fragment of Immunoglobulin Light Chain, ABri Peptide, ADan Peptide, N-Terminal fragments of Serum amyloid A protein, ChpD-H (*Streptomyces coelicolor*), MSP2, Spidroin (spider silk), Sup35p, Rnq1p, Swi1p, Cyc8p and MspA, preferably from the group comprising: HET-s prion domain, α-lactalbumin and Lysozyme.

In an embodiment, the protein or the peptide of the amyloid fibers are not from a human origin.

Preferably, the protein or the peptide of the amyloid fibers are not associated to a pathologic state or a disease in humans.

Some examples of amyloid fibers usable with the present invention include, but are not limited to, the proteins or peptides described in Pansieri et al., Nature photonics 13:473-479, 2019; Macfee & Dobson, J. Am. Chem. Soc. 122, 51:12707-12713, 2000; Otzen D., Prion 4, 4:256-264, 2010; Sawyer et al., PLOS One 6, 4, 2011; Moles et al., Futur Science OA, 1(2), FSO43, 2015; Slotta et al., Macromolecular Bioscience 7, 2:183-188, 2007; Bissig et al., Int. J. Mol. Sci. 17(9), 1438, 2016; Cervantes et al., Scientific Reports 6, 2016; Dueholm et al., JBC 290, 33:20590-2060, 2015.

In an embodiment, the amyloid fiber is associated or functionalized with at least one peptide, protein or chemical compound or is genetically modified to contain at least one artificial peptide domain.

Peptides, proteins, chemical compounds and artificial peptide domains used in the amyloid fiber of the invention preferably possess specific functions, such as cell-attachment, nanoparticle biotemplating, substrate adhesion, covalent immobilization of proteins or a combination thereof.

For example, some π-conjugated polymers can be added to the amyloid fiber in order to enhance its conductivity.

For example, a tripeptide RGD can be added to the amyloid fiber in order to enhance its cell interaction and attachment. Non-limitative examples of peptide domains adapted to the present invention are described in Nguyen et al., Nature Commun., 5:5945, 2014.

In an embodiment, the electrode of the invention comprises more than one layer of amyloid fibers.

In an embodiment, the electrode of the invention comprises two or more layers of amyloid fibers.

In an embodiment, the electrode of the invention comprises two or more layers of amyloid fibers and at least one layer is associated or functionalized with at least one peptide, protein or chemical compound or is genetically modified to contain at least one artificial peptide domain.

In an embodiment, the electrode of the invention comprises two or more layers of amyloid fibers and at two layers are associated or functionalized with at least one peptide, protein or chemical compound or are genetically modified to contain at least one artificial peptide domain.

In an embodiment, the invention relates to an electrode as defined above, said electrode being implantable.

In the present invention, the term "implantable" designates an electrode that can be put into or attached/grafted onto the body of a subject.

Preferably, an implantable electrode is biocompatible, biodegradable and/or non-toxic for human or animal health.

In an embodiment, the electrode of the invention is implantable into a nervous tissue.

In a particular embodiment, the electrode of the invention is implantable into the central nervous system and/or the peripheral nervous system.

In a more particular embodiment, the electrode of the invention is implantable in a nervous tissue selected from brain, spinal cord, nerves and ganglia.

In an embodiment, the electrode of the invention is implantable into muscles.

In an embodiment, the electrode of the invention is in the form of a patch or a needle.

In an embodiment, the electrode of the invention is a microelectrode.

By "microelectrode" is meant, according to the invention, an electrode that measures the electric potential from a single cell.

In an embodiment, the electrode of the invention can be placed onto the body of a subject without surgery. For example, such an electrode can be placed onto the skin of a subject.

In another aspect, the invention relates to an apparatus for the detection, the recording, the stimulation and/or the simulation of electrophysiological signals within living organisms comprising at least one electrode as defined above.

In the present invention, "an apparatus for the detection of electrophysiological signals" refers to a device allowing at least the detection of the presence or the absence of electrophysiological signals in a biological tissue.

In the present invention, "an apparatus for the recording of electrophysiological signals" refers to a device allowing at least monitoring of electrophysiological signals detected in a biological tissue, preferably in real-time.

In the present invention, "an apparatus for the stimulation of electrophysiological signals" refers to a device allowing at least the transmission of electrophysiological signals from the device into a biological tissue.

In the present invention, "an apparatus for the simulation of electrophysiological signals" refers to a device allowing at least the transmission of electrophysiological signals from the device into a biological tissue, said signals being similar in terms of frequency and/or of amplitude to electrophysiological signals that can naturally be detected in the biological tissue.

In an embodiment, the invention relates to an apparatus for the detection, the recording, the stimulation and/or the simulation of electrophysiological signals within living organisms, said apparatus comprising two or more electrodes as defined above.

In an embodiment, the apparatus of the invention is a medical device, preferably selected from the group comprising: a brain-machine interface system, a device for encephalogram, a device for electrocardiogram, a device for deep brain stimulation, a pacemaker, a device for restoring a sense (the sight, the smell, the hearing, the taste, the touch).

In another aspect, the invention relates to the use of amyloid fibers as an electrically conducting interface between a biological tissue and an apparatus.

In an embodiment, the invention relates to the use of amyloid fibers as an electrically conducting interface between a biological tissue and an apparatus within a device intended to be in contact with biological tissue.

In an embodiment, the biological tissue is not a human or animal body.

In an embodiment, the invention relates to the in vitro or ex vivo use of amyloid fibers as an electrically conducting interface between a biological tissue and an apparatus.

In an embodiment, the biological tissue is a cell culture.

In another aspect, the invention relates to the use of amyloid fibers in the manufacturing of an electrode, preferably an implantable electrode.

Preferably, the amyloid fibers are used as a coating agent for biointerface.

In another aspect, the invention relates to a method for manufacturing an implantable electrode comprising a step of applying at least one electrically conducting layer of amyloid fibers on a surface or an extremity of an electrode.

In an embodiment, the layer of amyloid fibers is applied under the form of a solution and left to dry to form a protein or peptide film.

In an embodiment, said solution comprises at least of 1 µM, 10 µM, 50 µM, 100 µM, 200 µM, 300 µM, 400 µM, 500 µM, or 1000 µM of protein or peptide.

In another aspect, the invention relates to a method for the detection, the recording, the stimulation and/or the simulation of electrophysiological signals within a subject, comprising a step of implanting in said subject an electrode as defined above.

In an embodiment, the invention relates to a method for the detection, the recording, the stimulation and/or the simulation of neuron signals or neuron-like signals within a subject, comprising a step of implanting in the subject an electrode as defined above.

In an embodiment, the invention relates to a method for the detection, the recording, the stimulation and/or the simulation of neuron signals or neuron-like signals within a subject, comprising a step of placing on the skin of the subject an electrode as defined above.

In an embodiment, said electrophysiological signals are central nervous signals, peripheral nervous signals or muscular signals.

Generally, it is considered that neuron and neuron-like signals have the following parameters: a spike duration from of approximately 1 ms, an interspike duration from 1 ms to 40 ms, an amplitude of approximately 80 mV, with a −60 mV offset.

The following Figures and Examples are put forth so as to provide those of ordinary skill in the art with a complete disclosure and description of how to make and use the present invention, and are not intended to limit the scope of what the Inventors regard as their invention nor are they intended to represent that the experiments below are all or the only experiments performed. While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

EXAMPLES

Example 1. Artificial Neuron-Like Spike Detection by Amyloid Fiber Film

Materials

Oscilloscope: Keysight InfiniiVision DSOX1102A/G 2-Channel Oscilloscope, 70/100 MHz, 2 GS/s Generator: Keysight ARB GENERATOR 33512B, 20 MHz, 2 Output, 16 bits, 160M Samples/s Electrode: Novocontrol Interdigitated Gold Electrode, BDS 1410-15-150

Temperature/Relative Humidity Sensor: Sensirion SHT75
Diluted mother solutions of amyloid fibers:
 Lysozyme: 20 g/L protein [1399 µM]. 3 mM HCl (pH=2.5)/90 mM NaCl
 HET-s: 289 µM protein. 0.1 mM HCl (pH=4)/No salts
 α-lactalbumin: 35 g/L protein [2500 µM]. 10 mM HCl (pH=1.7)/No salts Method The goal of the experiment was to inject voltage patterns and record output current passing through amyloid fiber films.

Figure 1:
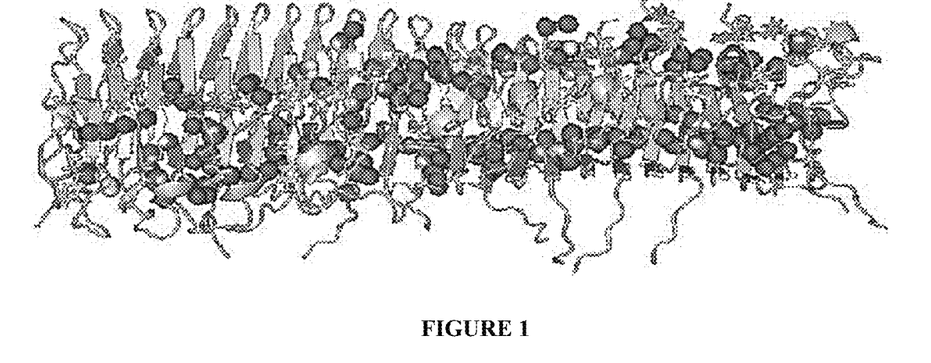
FIG. 1. Molecular model of 10 subunits of HET-s amyloid fibers. Attached water molecules are indicated by black beads.

Because of the nature of amyloid fibers, charges carriers responsible for charge transport are protons and ions: ions enter the fibers core through their terminal ends or their lateral faces and are guided along its axis. Protons are carried along the fiber by another mechanism. Indeed, amyloid fibers possess water channels resulting from their sophisticated hierarchical structures (FIG. 1). When the percolation threshold is reached, protons are able to "jump" from one building block to the other (Grothuss mechanism) until the end of the fiber. By the combination of those two phenomena fiber to fiber, a current is created to form a closed-loop circuit.

200 µL of buffer solution was applied onto the interdigitated electrode surface to wet it. The protein mother solution was diluted to achieve a concentration of 500 µM (except with HET-s).

After one hour, the buffer solution was removed and 200 µL of the diluted protein solution was dropped onto the electrode surface. It was left to dry for one or two days until water has evaporated.

Figure 2:
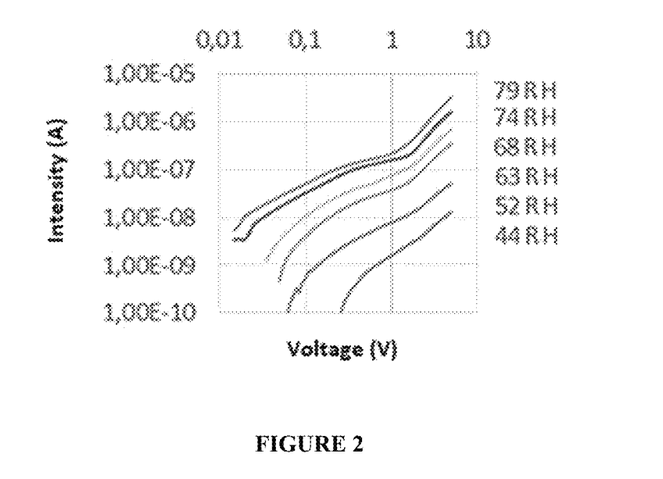
FIG. 2. Conductivity dependence with ambient relative humidity. Example taken from alpha-lactalbumin fibers dry films. RH: relative humidity.

Once the thin film of protein has dried (thickness of ca. 10 µm), the electrode was placed into a closed box. Because amyloid fiber conductivity depends highly on ambient humidity (FIG. 2), holes were made into the box to apply a continuous humid airflow. Temperature and ambient moisture were monitored by a sensor.

To achieve it, a 100 kΩ resistor was directly connected to the film. By measuring voltage drop at its terminal, the input current of the resistor can be determined (Ohm's Law), which is also the transferred current of the amyloid fiber film.

Figure 3:
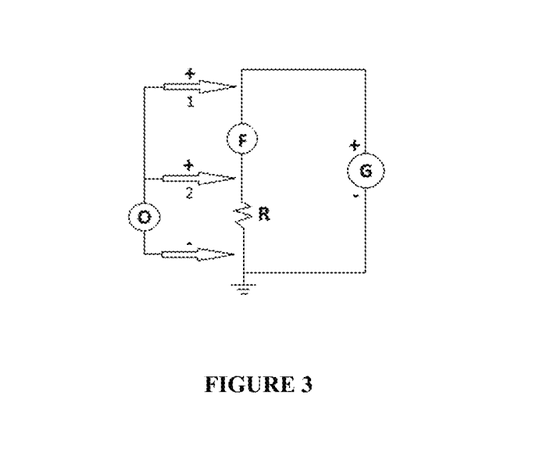
FIG. 3. Electrical setup scheme used in the experiments. F=amyloid fiber film. R=100 kΩ resistor. G=Generator. O=Oscilloscope. 1 & 2 illustrate measurements points for two different oscilloscope channels.

Keysight generator + terminal was connected to one end of the electrode, − terminal (which is linked to ground) to one end of the resistor. Keysight oscilloscope possess two channels: the first channel was branched over the resistor (output signal), the second channel over the generator (to verify and record the input signal). The whole setup scheme is represented FIG. 3.

Neuron-like pulse patterns were created using a handmade Matlab program coupled with BenchLink Waveform Generator software for signal integration (within Keysight generator).

Spike parameters were chosen carefully in order to have to the same structure as in vivo neuron action potentials. The goal was more to have the same generic properties (frequency, amplitude, patterns) than to recreate perfect in vivo signals.

Spike parameters are as follows:
 Amplitude: 80 mV+Offset −60 mV
 Pulse Width: 1 ms
 Inter-Pulse Width: Ranging from 2 to 6 ms
 Noise: White noise added
 Recurring Patterns: Active/Passive Behavior Once the signal loaded in the generator, ambient humidity was set at ca. 70% in order to have a good protonic conduction. No temperature change needs to be done; the experiment was conducted at ambient temperature.

Results

Figure 4:
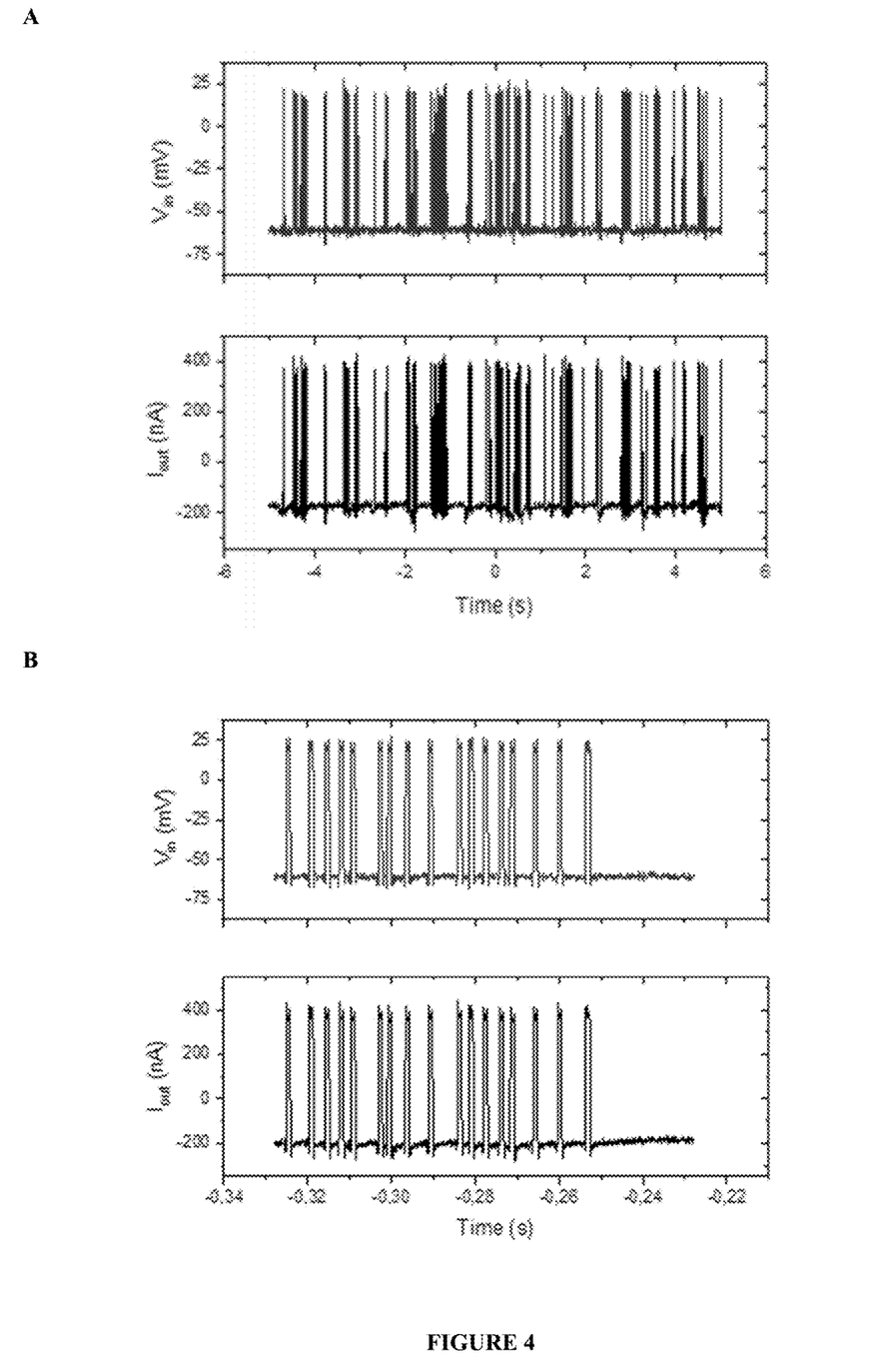
FIG. 4. Examples of α-lactalbumin 500 µM dry film responses (output current-upper graphs) to neuron-like signal stimulations (input current-lower graphs). A. Spike duration: 1 ms, Min=−60 mV/Max=20 mV, interspike duration: 4 ms to 40 ms. B. Zoom on A.
Figure 5:
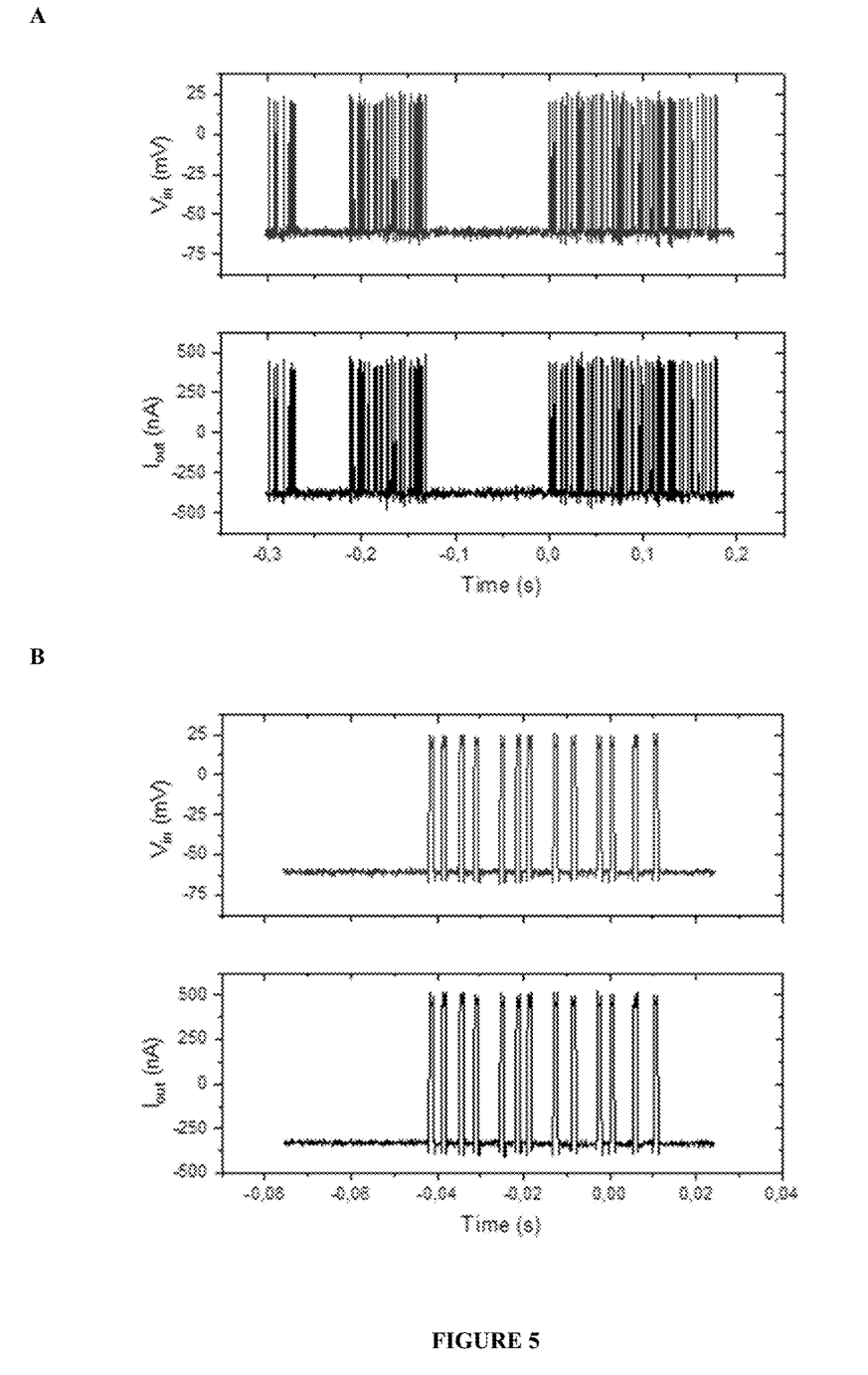
FIG. 5. Examples of lysozyme 500 µM dry film responses (output current-upper graphs) to neuron-like signal stimulations (input current-lower graphs). A. Spike duration: 1 ms, Min=−60 mV/Max=20 mV, interspike duration: 4 ms to 40 ms. B. Zoom on A.
Figure 6:
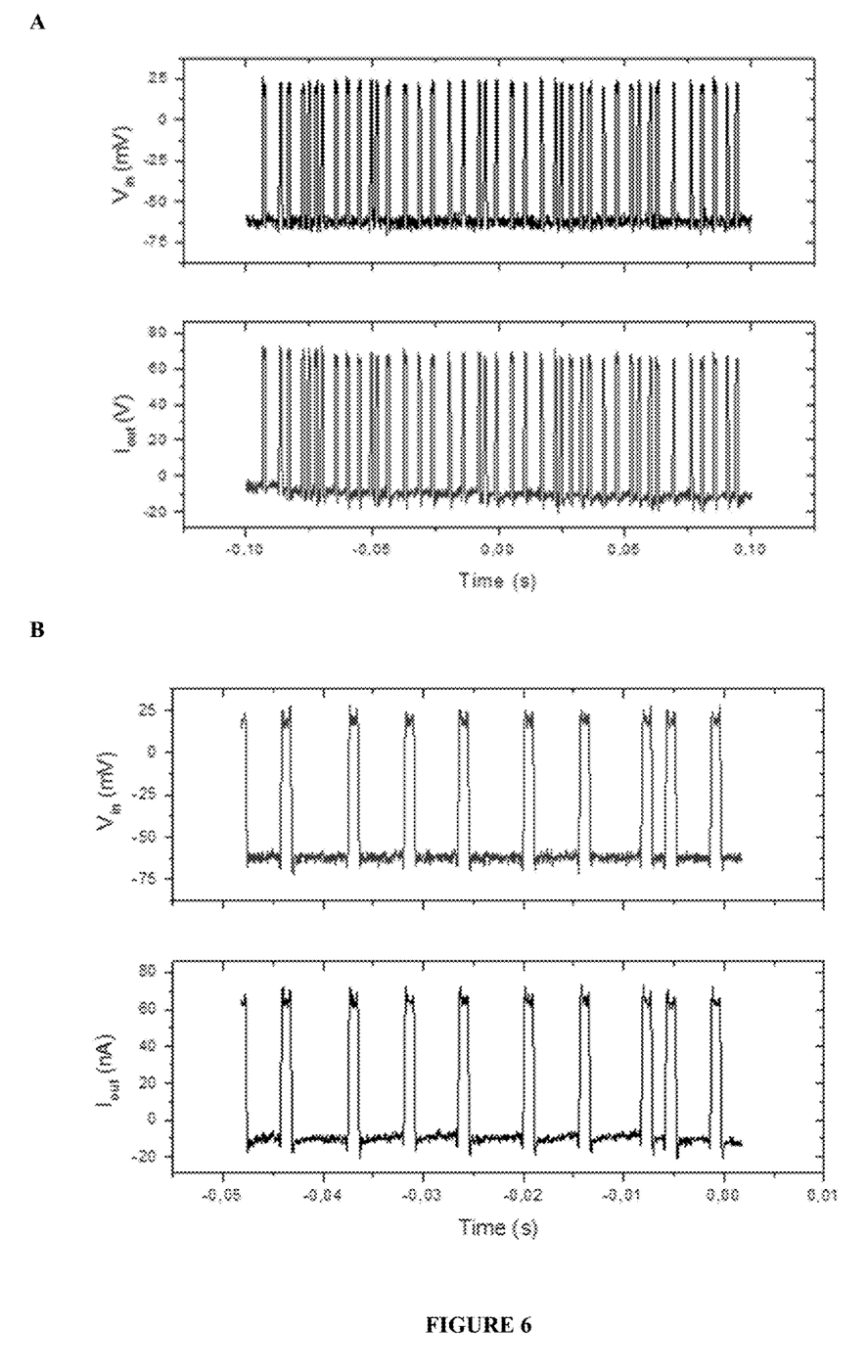
FIG. 6. Examples of HET-s 280 µM dry film responses (output current-upper graphs) to neuron-like signal stimulations (input current-lower graphs). A. Spike duration: 1 ms, Min=−60 mV/Max=20 mV, interspike duration: 4 ms to 40 ms. B. Zoom on A.
Figure 7:
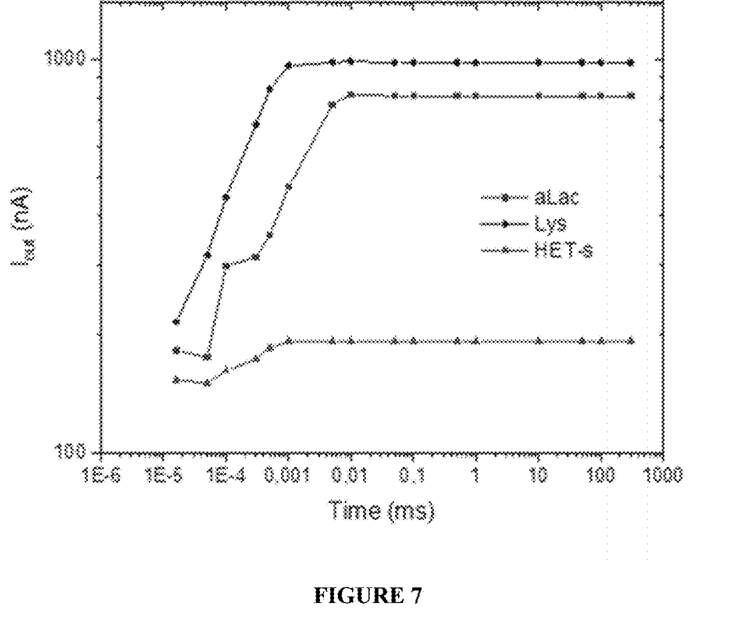
FIG. 7. Graph representing the current transferred from pulses (100 mV) with variable duration (abscissa) for dry films made from 3 types of amyloid fibers (α-lactalbumin, lysozyme or HET-s).
Figure 8:
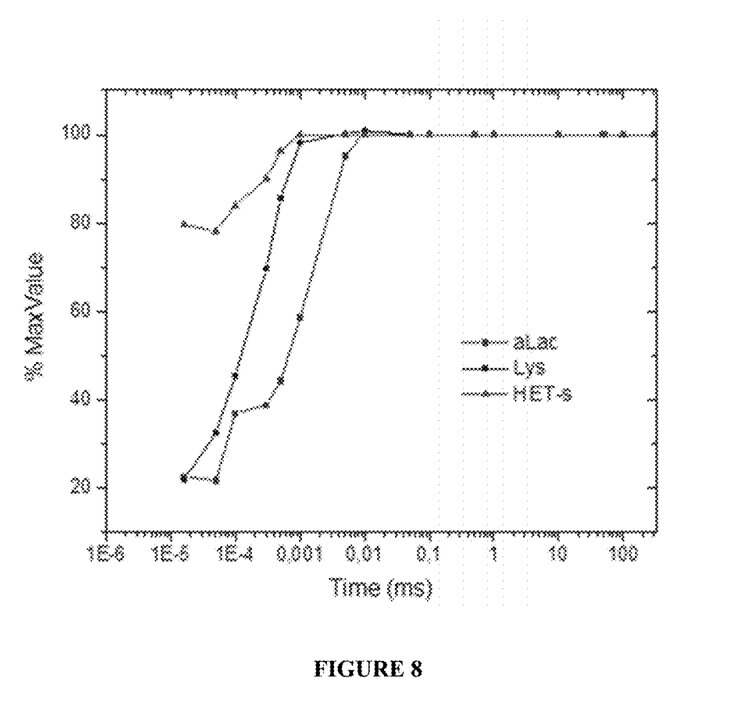
FIG. 8. Graph representing the ratio (in %) between the measured current and the current without deformation (maximum) from pulses (100 mV) with variable duration (abscissa) for dry films made from 3 types of amyloid fibers (α-lactalbumin, lysozyme or HET-s).

The results obtained with the films of amyloid fibers of α-lactalbumin (FIGS. 4, 7 and 8), of lysozyme (FIGS. 5, 7 and 8) and of HET-s (FIGS. 6, 7 and 8) demonstrate that amyloid fibers are able to conduct and detect neuron-like signals. Indeed, these results show that the amyloid fibers are able to receive and transmit such signals with minimal alteration of the imposed signal patterns.

The protein-based active layers did not reach their limits during the above-described first experiments. Indeed, further tests were performed to determine their temporal detection limit. It was observed that amyloid fibers dry films were able to detect spikes down to the microsecond timescale (for a Vpp=80 mV; Vpp total amplitude of the spike).

Moreover, the charge transport properties of amyloid fibers films can be fine-tuned by adjusting selected parameters, relative humidity (RH) being the most important one. Because their conductivity as function of relative air humidity has an exponential dependence, a small change in ambient moisture will translate into a substantial variation of its conductivity level. These features lead to an active layer with an easily tunable conductivity. All the previous experiments shown above were made with about 70% relative humidity (RH). For example, if one would like to increase the sensibility of the film, tuning the RH to 75% would double the output amplitude (and so signal-to-noise ratio). Controlling moisture around a device is not an easy task, but neuronal extracellular medium consists in 99% of water. This should allow the film to conduct enough to have an ultra-high resolution.

The resistance of the amyloid fiber film to degradation is also an important parameter. It was tested by forcing a 300 Hz, 1 ms continuous spike signal (⅓ duty cycle) over long period of time [~20k spikes/min]. After 4 hours, no distinct changes in amplitude output were noticed [~6 million spikes]. The day after, the film was again submitted to the same test and showed no change.

Example 2. Biocompatibility of Amyloid Fibers

Material

The biocompatibility of amyloid fibers was assessed using an in vitro mammalian cell culture. The study was based on the requirements of the International Organization for standardization 10993, Biological Evaluation of Medical Devices, Part 5 (2009): Tests for in vitro Cytotoxicity and Part 12 (2007): Test article preparation and reference materials.

Mammalian cell culture monolayer consisting of L-929 mouse fibroblast cells was used. 200 µL of Amyloid protein solution (500 µM) were mixed with 2 mL of PBS 1× for hydrogel formation. Amyloid fibers-based hydrogels were then washed three times with a PBS solution. A single preparation of the amyloid fibers-based hydrogel was extracted in single strength Eagle Minimum Essential Medium (EMEM10) at 37±1° C. for 24±2 hours. A negative control, reagent control and a positive control were similarly prepared. Following extraction, triplicate monolayers of L-929 mouse fibroblast cells were dosed with the extracts (100% for the controls and 100%, 50%, 10% and 1% for the amyloid fibers-based hydrogel) and incubated at 37±1° C. for 24±2 hours in presence of 5±1% $CO_2$. Following incubation, 20 µL of the MTS/PMS solution, prepared just before use, were dispensed in each well and incubated during 120-135 minutes at 37±1° C. in 5±1% $CO_2$.

The percent viability for the amyloid fiber-based hydrogel was determined as compared with the reagent control. A decrease/increase in the number of living cells results in a decrease/increase in the metabolic activity in the sample. This decrease/increase directly correlates to the amount of brown formazan formed, as monitored by the optical density at 492 nm.

The hydrogel of amyloid fibers was prepared based on a ratio of 3 $cm^2$/mL. The hydrogel was used at 100%, 50%, 10% and 1%.

The reagent control article was Eagle Minimum Essential Medium (EMEM1X) supplemented with 10% fetal bovine serum, 1% glutamine.

The negative control (High density polyethylene sheet/ Hatano Research Institute) was prepared based on a ratio of 6 $cm^2$/mL. A single preparation of the material was made and extracted at 37±1° C. for 24±2 hours. The negative control was tested at 100%.

The positive control was segmented polyurethane film containing 0.1% zinc diethyldithicarbamate (ZDEC/Hatano Research Institute) and was prepared based on a ratio of 6 $cm^2$/mL. A single preparation of the material was made and extracted using the same conditions as described for the amyloid fibers-based hydrogel. The positive control was used at 100%.

The percent viability is compared to the reagent control by using the following formula:

Percent Viability=100×$OD_{c492c}$/$OD_{c492rc}$

ODc (corrected OD)=$OD_{Amyloid\ fibers/negative\ control/positive\ control}$−$OD_{CM}$ $OD_{c492rc}$ is the mean value of the measured optical density of the Amyloid fibers or negative control or positive control extract.

$OD_{c492rc}$ is the mean value of the measured optical density of the reagent control.

$OD_{CM}$ is the mean value of the measured optical density of culture medium without cells (CM)

Results

All system suitability criteria were met indicating a valid test assay.

All Amyloid fibers extracts showed no cytotoxic potential to L-929 mouse fibroblast cells as shown in Table 1.

TABLE 1

Percent viability of amyloid fibers extracts, negative control and positive control and cytotoxic potential of Amyloid fibers extracts.

| Material | Percent Viability of Control Articles | System Suitability |
|---|---|---|
| Positive control (100%) | 3% | Met criteria |
| Negative control (100%) | 97% | Met criteria |

| Material | Percent Viability of Amyloid fibers | Cytotoxic Potential |
|---|---|---|
| Amyloid fibers (100%) | 103% | No cytotoxic potential |
| Amyloid fibers (50%) | 100% | No cytotoxic potential |
| Amyloid fibers (10%) | 100% | No cytotoxic potential |
| Amyloid fibers (1%) | 97% | No cytotoxic potential |

Example 3. In Vivo Testing of Amyloid Fiber

Material

The experimental protocol was as follows:

This in vivo study was carried out according to the ISO 10993-6: 2016 standard which specifies the test methods for evaluating the local effects after implantation of biomaterials intended for use in medical devices.

The implantation surgery was performed according to the following protocol:

The implanted samples were of 2 types:
1. cylindrical-shaped mandrels in 316L stainless steel (length of 6 mm and diameter of 800 pin), n=3,
2. cylindrical-shaped mandrel in 316L stainless steel coated with amyloid fibers, n=6.

The first step consisted of performing a craniotomy according to the following steps:
induction of the animal by gas anesthesia,
installation of the animal in a Kopf type stereotaxis frame,
midline incision of the scalp and resection of the subcutaneous tissue,
drilling of the cranial box (diameter approximately 2 mm),
incision of the dura,
implantation of mandrels within the right cerebral hemisphere in the caudate nucleus/putamen (mandrel inserted 5 mm high in the cerebral parenchyma),
sealing performed with aseptic surgical wax,
suture of the scalp and disinfection.

Postoperative pain was taken care of by intramuscular administration of 0.1 mg/kg of Buprenorphine (Vetergesic®).

No major problems were encountered during the surgeries which were performed by the same person.

Monitoring of rats during the month of implantation of the mandrels: weight, behavior, physical appearance.

Following the surgeries, the rats were followed during the month of accommodation, with daily monitoring of the animals according to the score and cut-off point application defined below.

The animals were examined daily and a clinical score was assigned to them according to the grid below (see Table 2). Any score greater than or equal to 3 result in euthanasia of the animal to the detriment of the experimental protocol.

TABLE 2

Grid for clinical score.

| Change in initial body weight | Physical appearance | Behavior |
|---|---|---|
| 0 Normal | 0 Normal | 0 Normal |
| 1 Weight loss < 10% | 1 Lack of grooming | 1 Minor changes: limping gait, wound protection |
| 2 Weight loss between 10 and 15% | 2 Ruffled coat, runny nose/eye | 2 Abnormal: reduced mobility, inactive |
| 3 Weight loss > 20% | 3 Very disheveled coat, abnormal posture | 3 Vocalizations, self-mutilation, very agitated or immobile |

This follow-up includes weighing of each rat, at least once a week. The rats were all weighed according to the same protocol and on the same scale throughout the month of accommodation. All of the rats had constant weight curves. The behavior of the rats (activity, movements) as well as their physical appearance (state of the coat, posture) remained normal throughout this in vivo study, not reflecting any discomfort or suffering.

At the end of the study, the rats were euthanized and then exsanguinated in order to better preserve the brains for the histological study:
1) Fixed anesthesia by Exagon (intraperitoneal injection)
2) Intracardiac infusion of 0.9% NaCl (200 ml)
3) Intracardiac formalin infusion (400 ml)
4) Collection of the anatomical part (brain) containing the mandrel The brain preparation protocol is as follows:
Fixation of the brain in formalin
15% sucrose impregnation
Sucrose impregnation 30%
Removal of chucks
Freezing of the anatomical part in liquid nitrogen vapor
Brain sections made perpendicular to the axis of the mandrel, 35 µm floating sections made with a cryostat and placed in a cryopreservation solution at −20° C.

Staining of Rat Brain Sections with Cresyl Violet

Cresyl violet staining is a histological staining method used to reveal the cellular architecture of nervous tissues of which it stains the cell bodies and more particularly the rough endoplasmic reticulum and makes it possible to identify phenomena of cell proliferation or loss (necrosis) around the implanted area. The protocol used is as follows:
Degreasing: successive baths of different concentrations of ethanol
Washing with water
Coloring of sections in a solution of cresyl violet
Fixation with 70% and 95% ethanol
Washing with water
Immersion of the slides in a differentiation solution
Washing with water
Succession of ethanol bath of different concentrations
Xylene bath The acquisitions were made on a bright field microscope.

The "316L stainless steel mandrel" control allowed to evaluate the effects of implantation of the mandrel within the cerebral parenchyma and constitutes a negative control given that the characteristics of the mandrel (dimensions, shape and material) give it an implantable character not inducing an inflammatory reaction.

Figure 9:
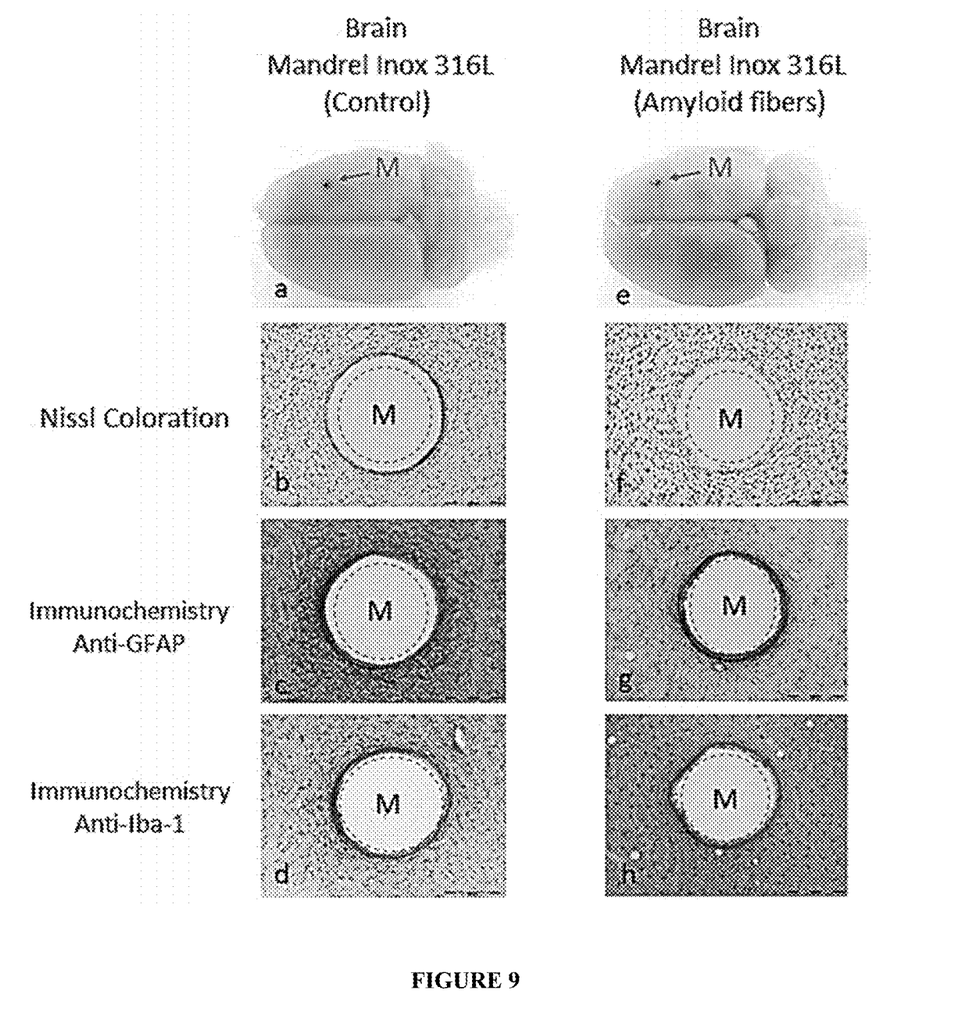
FIG. 9. Macrophotography of rat brains with mandrels (M) implanted in the right cerebral hemisphere: brain having received a 316L stainless steel mandrel (a), brain with stainless steel mandrel+amyloid fibers (e). Microphotography of rat brain sections stained with cresyl violet (Nissl staining) after implantation of a 316L stainless steel mandrel (b) or a stainless steel mandrel coated with amyloid fibers (f). Microphotography of sections of rat brains labeled with the antibodies directed against the GFAP and Iba-1 proteins: with 316L stainless steel mandrels (respectively c and d for GFAP and Iba-1) and 316L stainless steel mandrels+amyloid fibers (respectively g and h for GFAP and Iba-1).

Nissl staining showed that for all the cerebral hemispheres implanted with 316L stainless steel mandrels, no proliferation or cell loss was observed around the implanted area (marked with the letter M and delimited by a dotted line on the FIG. 9b). For the cerebral hemispheres having received the 316L stainless steel mandrels coated with amyloid fibers, the cerebral parenchyma located near the implanted area did not show any tissue damage (proliferation or necrosis) and remain similar to those of the control condition (FIG. 9f).

These results suggest that amyloid fibers appear to be well tolerated by the cerebral parenchyma for a contact duration of 1 month.

Anti-GFAP and Anti-Iba1 Immunohistochemistry

Glial fibrillar acidic protein (GFAP) is an intermediate filament present in certain glial cells of the central nervous system, in particular astrocytes.

The Iba1 labeling is specific for the protein Ionized calcium-binding adapter molecule 1 (Iba1). Among brain cells, the Iba1 protein is specifically expressed in microglia. Microglial activation is another type of inflammatory reaction that involves the activation of microglia, the immune cells in the brain. Microglial cells go through different stages of activation, the extensions of the cells widen more and more until they form a sphere (macrophage stage).

The protocol followed for the GFAP and Iba-1 immunolabeling is as follows:
DAY 1: Washing of sections in 1×PBS
PBS-Triton-NGS membrane permeabilization
Saturation with PBS-BSA 3%
Incubation with the primary antibody overnight
DAY 2: PBS-BSA-Tween wash
Incubation with the secondary antibody
PBS-BSA-Tween wash
Assembly of the cuts between blade and coverslip The acquisitions were carried out under a confocal microscope after a selection of the slides under an epi-fluorescence microscope.

The antibodies used are:
GFAP: specific for glial fibrillar acid protein (GFAP) which is an intermediate filament present in certain glial cells of the central nervous system, in particular astrocytes.
Iba1: specific for the ionized calcium-binding adapter molecule 1 protein (Iba1).

Among brain cells, the Iba1 protein is specifically expressed in microglia (immune cells of the brain).

Anti-GFAP Immunohistochemistry for the Detection of Astrocytic Gliosis

GFAP labeling is specific for glial fibrillar acidic protein (GFAP) which is an intermediate filament present in certain glial cells of the central nervous system, in particular astrocytes.

Astrocytic gliosis is an inflammatory reaction that involves the activation of astrocytes within brain tissue. When these astrocytes are activated, their cell bodies become rounded and their cytoplasmic extensions thicken.

The immunostaining directed against the GFAP protein showed that for all the cerebral hemispheres implanted with the 316L stainless steel mandrels, no proliferation or astrocyte morphological modification was observed around the implanted area (marked with the letter M and delimited by a dotted line in FIG. 9c). For the cerebral hemispheres having received the 316L stainless steel mandrels coated with amyloid fibers, the results obtained were comparable to those of the control condition (FIG. 9g). The absence of astrocytic gliosis around the area implanted with the mandrel coated with amyloid fibers suggests that the latter do not induce an inflammatory reaction after a period of contact with the brain parenchyma for 1 month.

Anti-Iba1 Immunohistochemistry for the Detection of Microglia Activation

The immunostaining directed against the Iba-1 protein showed that for all the cerebral hemispheres implanted with the 316L stainless steel mandrels no microglial activation was observed around the implanted area (marked with the letter M and delimited by a line dotted in FIG. 9d). Histologically, the microglial cells around the implanted area exhibit a small cell body (low volume cytoplasm) with some fine cytoplasmic extensions, characterizing resting microglia. For the cerebral hemispheres having received the 316L stainless steel mandrels coated with amyloid fibers, the results obtained were comparable to those of the control condition (FIG. 9h) and it was not observed any reactive microglial cells in the zone of the trajectory of the mandrel.

The absence of microglial activation around the area implanted with the mandrel coated with amyloid fibers suggests that the latter do not induce an inflammatory reaction after a contact period of 1 month with the brain parenchyma.

In conclusion, the implantation of the mandrel coated with amyloid fibers does not induce any tissue damage or any inflammatory reaction after 1 month of contact with the brain parenchyma. These explorations have demonstrated an adapted response of the host tissue and demonstrate the implantable nature of amyloid fibers at a cerebral site and allow their use in implantable devices to be considered.

Example 4. Testing with Real Physiological Pulses

After the experiment on artificial signals, the material made of HET-s proteins in amyloid fiber form was tested with real physiological pulses.

Figure 10:
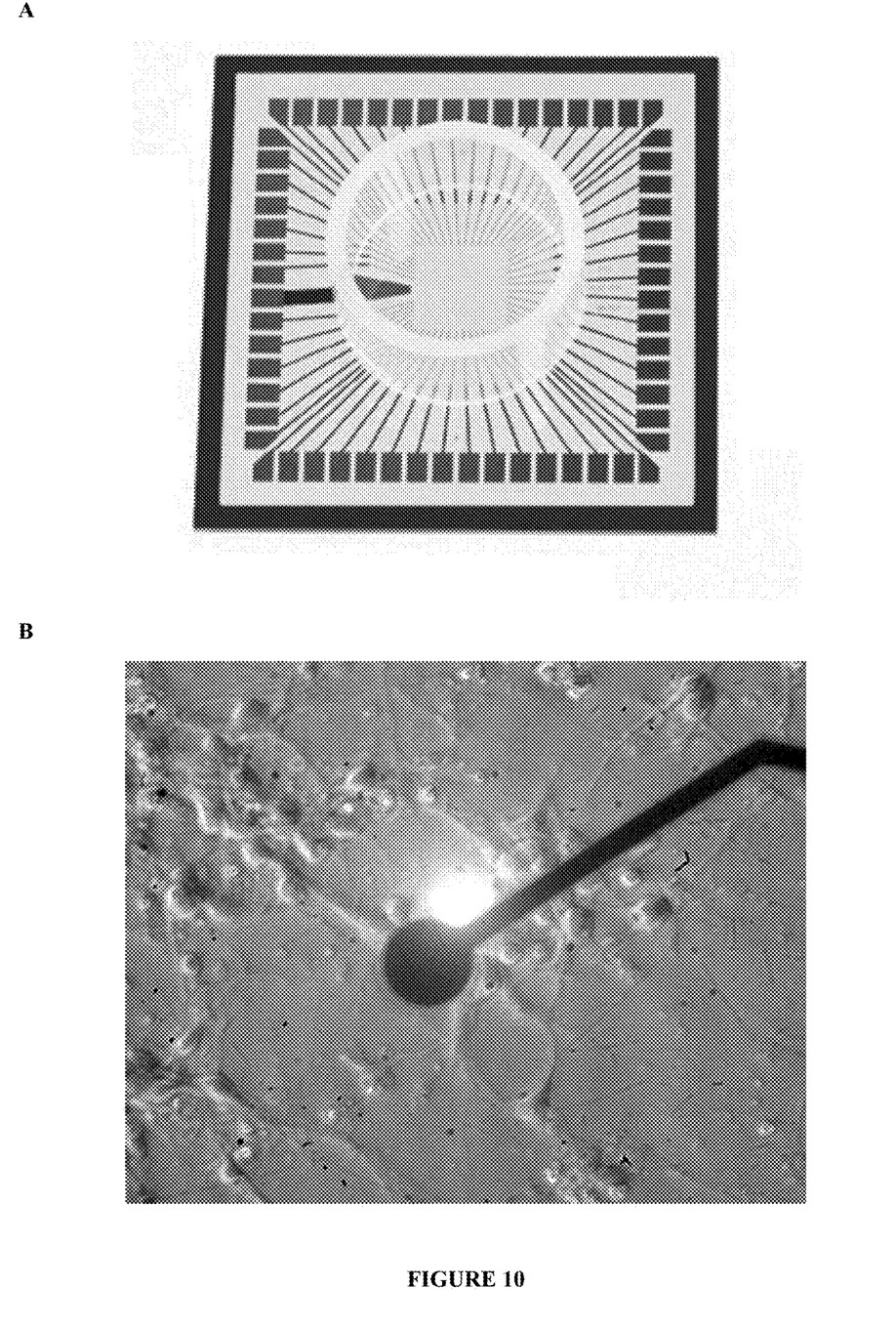
FIG. 10. Setup for action potential recording. A. Microelectrode arrays (MEA). B. Photography of the electrode-recording site below the neuronal culture.

To do so, microelectrode arrays (MEA) bought from Multichannel Systems, which are widely used for simultaneous recordings on neuronal cells, were used (FIG. 10A). A drop of 100 μL HET-s proteins in amyloid fiber form was casted on the MEA and left to dry overnight. Then, the film was washed several times with the cell culture medium before adding a primary culture of mouse hippocampal neurons. Because the culture medium is around pH7, HET-s dry film transforms into a consistent hydrogel.

FIG. 10B shows an electrode-recording site below the neuronal culture. The hydrogel is invisible because the dimension of the fiber network is well beyond the resolution of the image, but it is located between the electrode array and the neurons. On regular MEA's measurements, monolayer of Poly-D-Lysine (PDL) and/or Poly-L-Lysine (PLL) are often used as cell adhesion enhancers but are not fit to be used for middle/long term in in vivo application due to a fast degradation of the layer. It is noticed here that, while the PLL layer thickness is few nanometers, the Het-s hydrogel is several micrometers.

Figure 11:
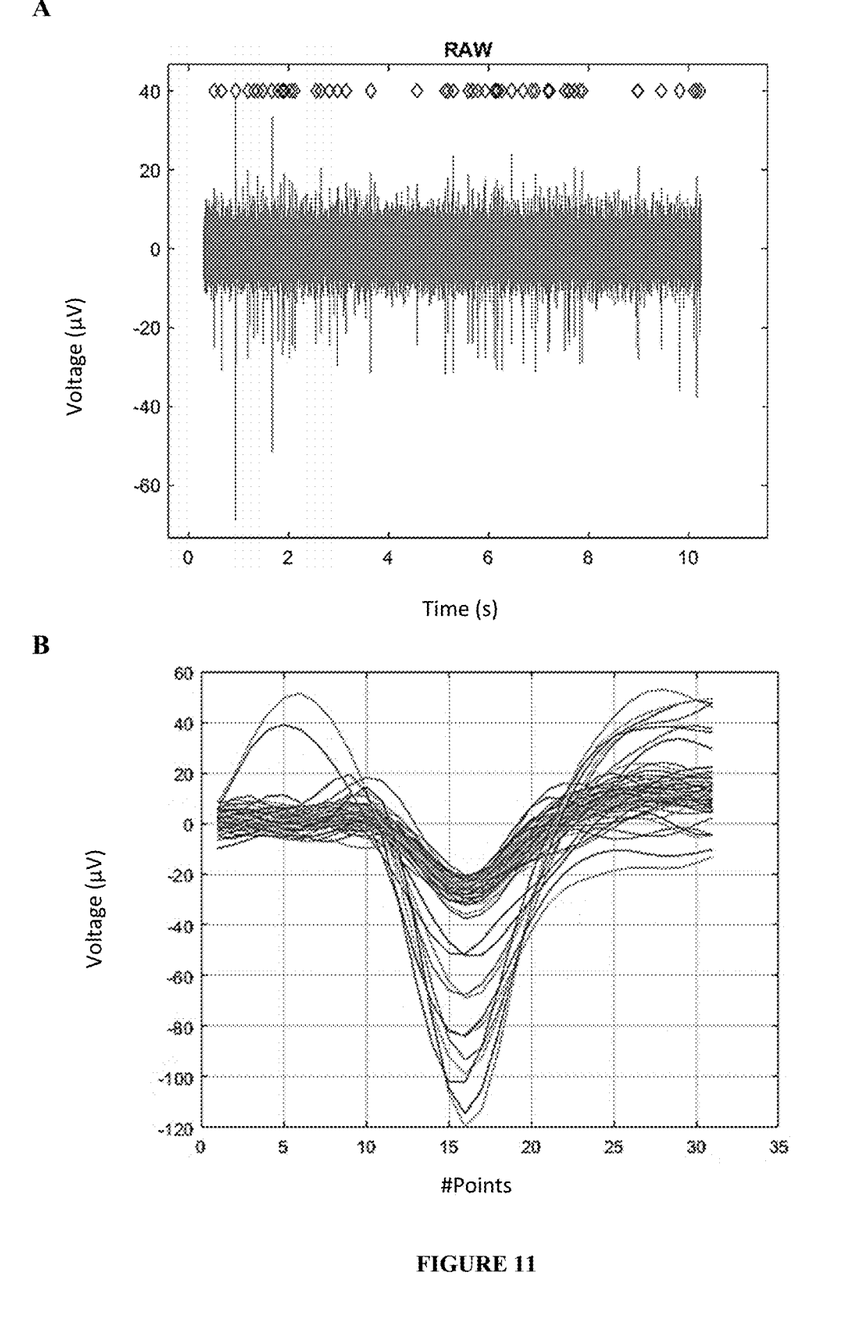
FIG. 11. A. Example of action potential recording with the setup shown in FIG. 10. Diamond marks represents the locations were pulses have been detected. B. Pulse-like signals observed in the same range of voltage than regular modern electrode recordings, and with a pulse morphology as expected for typical action potential with polarization and depolarization phases.

FIG. 11A present an example of action potential recording with the setup described in FIG. 10. Diamond marks represents the locations were pulses have been detected. As criteria, we selected pulses that were 1 ms wide (typical neuron action potential) and at least 20 μV deep. Despite the presence of an HET-s hydrogel between the neurons and the electrode, we were able to detect plenty of pulse-like signals in the same range of voltage than regular modern electrode recordings, and with a pulse morphology as expected for typical action potential with polarization and depolarization phases (FIG. 11B). Therefore, it is possible to affirm that HET-s coating onto an abiotic electrode allows the charges to be passed through, resulting in the detection of physiological neuronal pulses. At the end, it allows the use of a biocompatible, biodegradable material that possesses an ionic/protonic conductivity, which makes it a great pretender for electrode or electrode coatings technologies.

Concluding Remarks

The purpose of HET-s coating on inorganic electrodes lies in multiple aspects:
1) Without adding any external growth factors, primary neurons, which are extremely sensitive to their environment, are able to develop very well on HET-s hydrogels, until DIV10 from the last results. Indeed, similarly to carbon nanotubes, HET-s amyloid fibers possess a very high aspect ratio (~1000), thus making it very well fitted to promote growth and development on cells that attach to these kind of structure.
2) Action potentials made of ion and proton gradients are transmitted through the amyloid network from the cells to the electrode. HET-s hydrogel acts as an intermediary that is able to relay ionic information. That protonic conductivity is uncommon and lowers the overall contact resistances of the measure.
3) HET-s amyloid fibers are biodegradable and biocompatible as shown above with the cytotoxicity results. Moreover, the hydrogel do not dilute itself in aqueous medium, which is essential to be used as electrode or electrode coating.

The invention claimed is:

1. A system comprising:
   a. a medical device selected from the group comprising: a brain-machine interface, a device for encephalogram, a device for electrocardiogram, a device for deep brain stimulation, a pacemaker, or a device for restoring a sense; and
   b. an electrode assembly connected to the medical device, wherein the electrode assembly comprises at least one layer of amyloid fibers covering a surface or extremity of an electrode; wherein the at least one layer of amyloid fibers is configured to be in contact with a biological tissue, such that the amyloid fiber layer utilizes protonic and ionic conductivity and not electronic conduction with the biological tissue.

2. The system according to claim 1, wherein the electrode assembly is configured to provide a bidirectional communication between a biological tissue and a medical apparatus.

3. The system according to claim 1, wherein the at least one layer of amyloid fibers is in the form of a film.

4. The system according to claim 1, wherein the at least one layer of amyloid fibers has a thickness not exceeding 1000 μm when the layer of amyloid fibers is in an aqueous environment.

5. The system according to claim 1, wherein the at least one layer of amyloid fibers are aggregates of monomers of a protein or a peptide selected from the group comprising: HET-s prion domain, α-lactalbumin, Lysozyme, Aβ1-42, htau, α-synuclein, TTR (V30M), IAPP, β-Lacloglobulin, HAS, Insulin, CSNNFGA, NNLAIVTA, CsgA, PMEL17, Ure2p, Orb2 (CPEB), SH3 domain PI3 kinase, Acylphosphatase, Prion Protein, Islet Amyloid PolyPeptide, Prolactin, Galectin 7, Corneodesmosin, Lactadherin, Kerato-epithelin, Lactoferrin, Semenogelin, Enfuvirtide, APP, Apolipoproteins, Gelsolin, β2-microglobulin, Transthyretin, TasA, FapC, SP-C, LECT-2, Proteins S100A8/A9, Huntingtin exon-1, Fragment of Immunoglobulin Heavy Chain, Fragment of Immunoglobulin Light Chain, ABri Peptide, ADan Peptide, N-Terminal fragments of Serum amyloid A protein, ChpD-H (*Streptomyces coelicolor*), MSP2, Spidroin (spider silk), Sup35p, Rnq1p, Swi1p, Cyc8p and MspA.

6. The system according to claim 1, wherein the at least one layer of amyloid fibers has a thickness not exceeding 100 μm when the layer of amyloid fibers is in an aqueous environment.

7. The system according claim 1, wherein the at least one layer of amyloid fibers has a thickness not exceeding 10 μm when the layer of amyloid fibers is in an aqueous environment.

8. The system according to claim 1, wherein the at least one layer of amyloid fibers are aggregates of monomers of a protein or a peptide selected from the group comprising HET-s prion domain, α-lactalbumin and Lysozyme.

9. The system, according to claim 1, the electrode assembly being implantable configured to be implanted in a nervous tissue.

10. The system according to claim 9, the nervous tissue being selected among the group comprising: brain, spinal cord or nerves.

11. A method of detecting, recording, stimulating, simulating or a combination thereof, electrophysiological signals with the system of claim 1, the method comprising:
 applying the electrode assembly to a biological tissue; and
 forming an electrically conducting interface between the biological tissue and the apparatus with the at least one layer of amyloid fibers.

12. A method for manufacturing a system comprising:
a. providing a medical device selected from the group comprising: a brain-machine interface, a device for encephalogram, a device for electrocardiogram, a device for deep brain stimulation, a pacemaker, or a device for restoring a sense; and
b. applying at least one layer of amyloid fibers on a surface or extremity of an electrode to provide an electrode assembly, wherein the electrode assembly is electrically connected to the medical device;
c. positioning the electrode assembly on a biological tissue, wherein the at least one layer of amyloid fibers is configured to contact the biological tissue, such that the amyloid fiber layer utilizes protonic and ionic conductivity and not electronic conduction with the biological tissue.

\* \* \* \* \*